United States Patent [19]
Yasuda

[11] 4,422,334
[45] Dec. 27, 1983

[54] HYDROSTATIC BEARING TYPE COUPLING FOR USE IN VIBRATING MACHINE

[75] Inventor: Osamu Yasuda, Yokosuka, Japan

[73] Assignee: Ishikawajima-Harima Jukogyo Kabushiki Kaisha, Tokyo, Japan

[21] Appl. No.: 312,837

[22] Filed: Oct. 19, 1981

[51] Int. Cl.³ .......................... B06B 1/10; G01M 7/00
[52] U.S. Cl. ...................................... 73/665; 73/663; 403/57; 403/74; 464/113
[58] Field of Search ................. 73/663, 665, 667, 668; 403/57, 53, 74, 59; 464/113

[56] References Cited
FOREIGN PATENT DOCUMENTS
52-36056 of 1977 Japan.

*Primary Examiner*—Howard A. Birmiel
*Attorney, Agent, or Firm*—Scrivener, Clarke, Scrivener and Johnson

[57] ABSTRACT

The present invention provides a hydrostatic bearing type coupling for a vibrating machine. The coupling is interposed between a vibration table upon which a test specimen or the like is mounted and a vibrator in such a way that even when the vibration table is caused to vibrate three-dimensionally, there are free movements in the two directions.

5 Claims, 10 Drawing Figures

HYDROSTATIC BEARING TYPE COUPLING FOR USE IN VIBRATING MACHINE

BACKGROUND OF THE INVENTION

A vibration table upon which is mounted a test specimen or the like is connected with vibrators through couplings. The purpose of the vibration table is to investigate the behavior of a building and test specimens in an earthquake, and the couplings must have the following functions and must accomplish these functions satisfactorily:

(1) The force and the amount of displacement of the vibrator must be transmitted to the vibration table positively and without any time delay. From the theoretical standpoint of analyzing vibration, lost motion and friction in the coupling must be minimized.

(2) The vibrators are generally mounted on a foundation and the vibration table makes two- or three-dimentional movement depending upon its function. To this end, the axial force and displacement of the vibrator must be transmitted to the vibration table and must slide within the bearing strokes against the movements perpendicular to the table. In addition, the sliding frictional resistance must be reduced as much as possible. In general, hydrostatic bearings are used.

(3) The construction must be such that even if the position of the vibration table is distorted under vibrations so that the mounting surface is inclined, no excessive force is exerted to the bearings.

There have been devised various types of couplings which connect such vibrators with the vibration table. For instance, there has been available a hydrostatic bearing type coupling c as shown in FIG. 1 which is interposed between a vibration table a and a vibrator b and includes a spherical body d. The coupling c is rotatably and slidably supported, through the spherical body d, by a supporting member e which extends from the vibration table a. A pressurized oil source f is communicated with the bearing surfaces, whereby the hydrostatic bearing is provided.

In this case, the coupling c is connected to the supporting member e on the vibration table a in a cantilever manner. Therefore, there arises no problem concerning the transmission of the axial force of the vibrator and the absorption of the displacement in the directions perpendicular to the direction of the axial force. However, if "wrenching" occurs due to the distortion of the table a, they cannot slide with small frictional resistances because the spherical surface of the body d does not form a hydrostatic bearing.

There has been also devised and demonstrated a coupling which, as shown in FIG. 2, transmits the force through a connecting rod g whose both ends are terminated by spherical shapes.

With this system, however, when the vibrator b causes the vibration table a to move in one direction, the connecting rods g which support the table a are caused to swing as indicated by the double-pointed arrrows. There must be therefore provided a control for cancelling the displacement due to this swinging motion by the motion of other vibrators. As a result, accurate control of the position of the table is difficult.

One of the objects of the present invention is to provide a coupling device which is simple in construction, has small lost motion and is simple in assembly and mounting.

Another object of the present invention is to provide a coupling device which exhibits minimum frictional resistance to every movement, is free of the influence from other vibrators and obtains correct waveforms by a simple control.

Preferred embodiments of the present invention will be described with reference to the accompanying drawings.

DETAILED DESCRIPTION OF THE PREFERRED EMBODIMENTS

Figure 1:
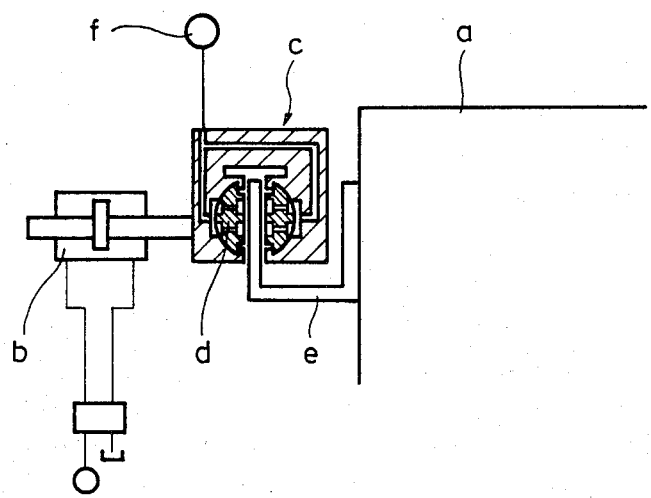
FIGS. 1 and 2 are views used for the explanation of prior art coupling devices.
Figure 2:
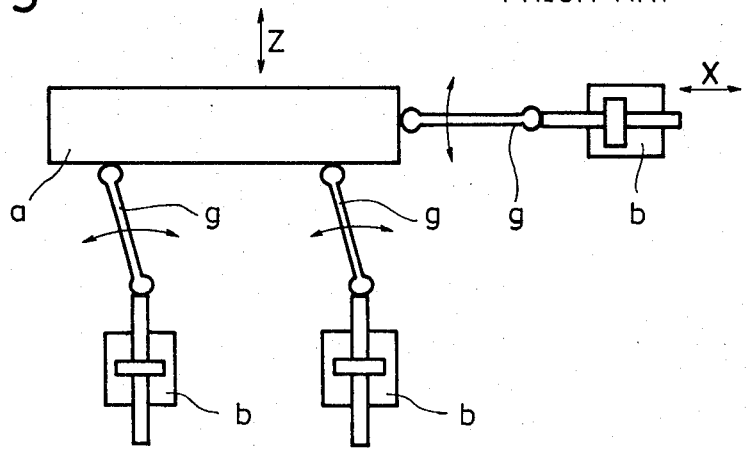
Figure 3:
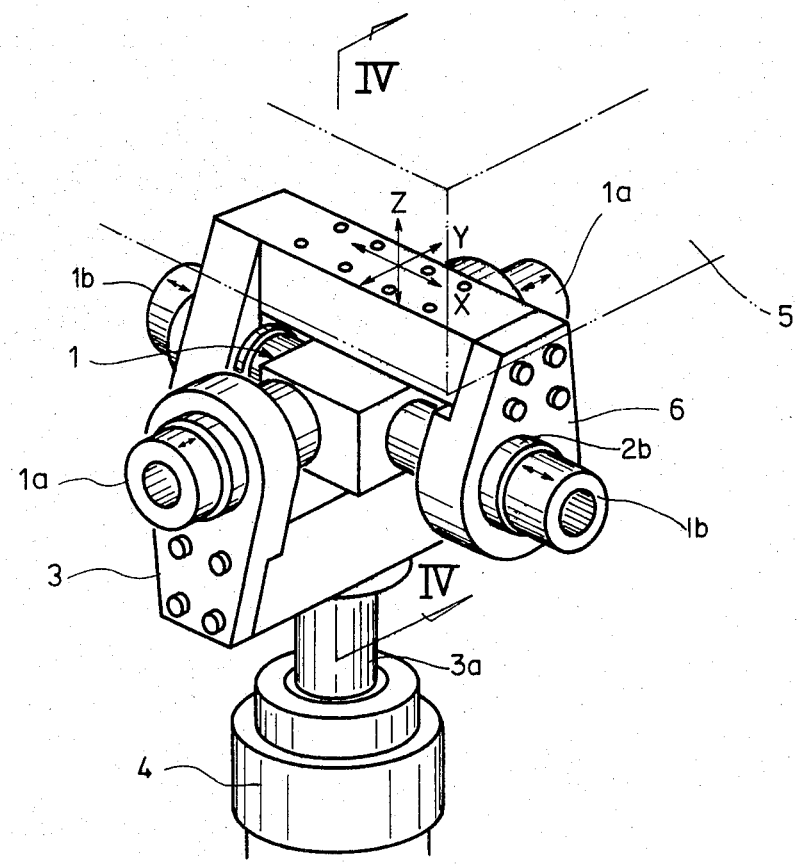
FIG. 3 is a perspective view of a first embodiment of the present invention.
Figure 4:
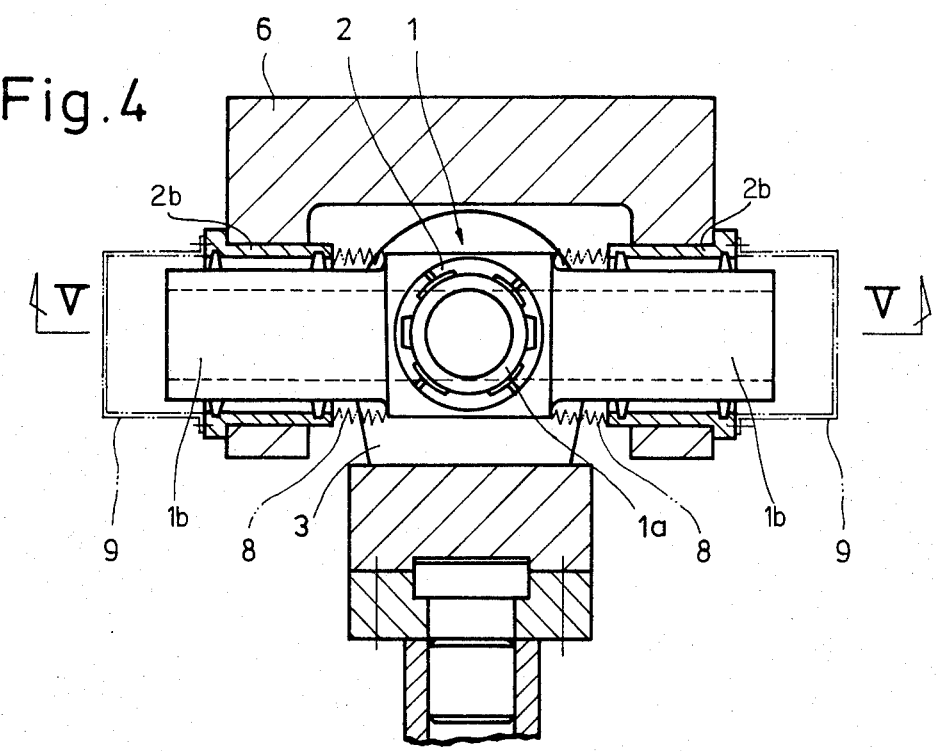
FIG. 4 is a view as viewed in the direction indicated by the arrows IV—IV of FIG. 3.
Figure 5:
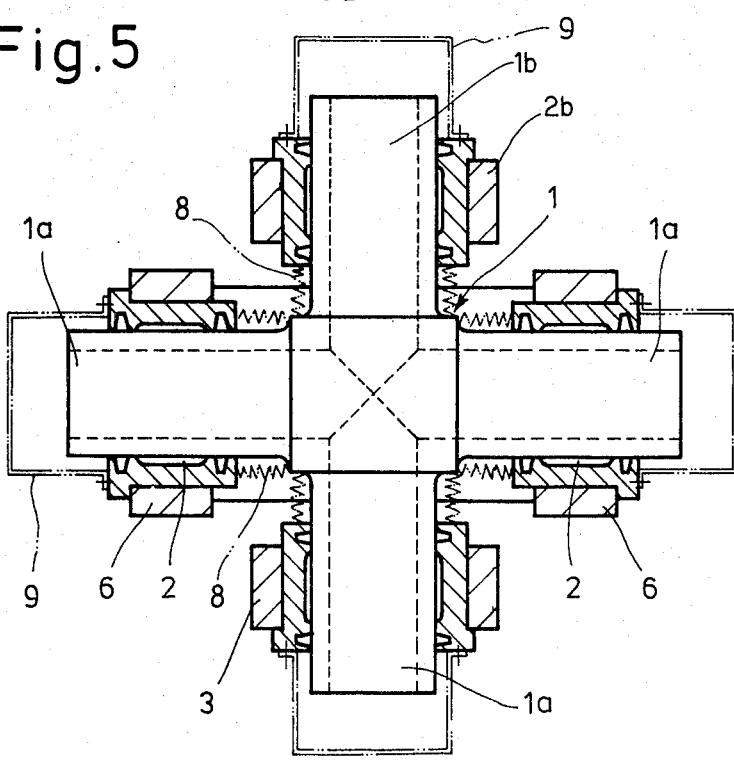
FIG. 5 is a view as viewed in the direction indicated by the arrow V—V of FIG. 4.

Referring first to FIGS. 3 to 5, a cross-shaft assembly generally indicated by the reference numeral 1 has two co-axial shafts 1a and two co-axial shafts 1b, the axes of the two pairs of shafts crossing each other at right angles so that the shafts are spaced at 90° from each other about the central point. The first pair of co-axial cross shafts 1a are supported by hydrostatic bearings 2 so that the cross shafts 1a can rotate and axially slide in the hydrostatic bearings 2. These hydrostatic bearings 2 are mounted on a bracket or yoke 3 which in turn is mounted on the rod 3a of a vibrator 4. In like manner, the second pair of co-axial cross shafts 1b whose axis is perpendicular to that of the first pair are supported by hydrostatic bearings 2b mounted on a bracket or yoke 6 which in turn is attached to a vibration table 5. As a result, only the vibrations in the direction (Z) of the axis of the rod 3a of the vibrator 4 can be transmitted to the vibration table 5 while the movements in the other two directions (X and Y) perpendicular to the former can be completely absorbed by the hydrostatic couplings.

Figure 8:
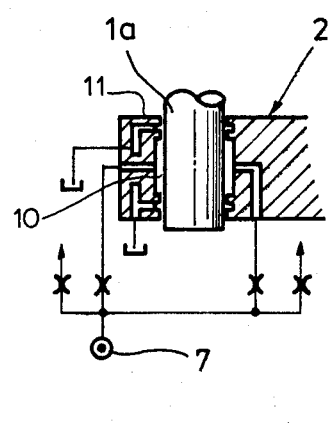
FIG. 8 is a view used for the explanation of a hydrostatic bearing.
Figure 9:
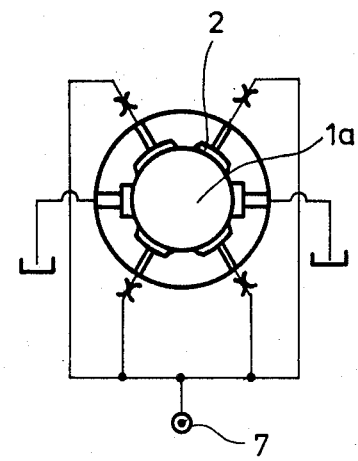
FIG. 9 is a cross sectional view thereof.

In FIGS. 8 and 9 are shown in detail the construction of each of the hydrostatic bearings. A lubricating oil under pressure is forced to flow from a lubricating oil source 7 into the space 10 between the spaced bearing surfaces 11 of the cross shaft 1a (or 1b) and the hydrostatic bearing 2 or 2b. Reference numerals 8 and 9 designate shaft covering sleeves.

Figure 10:
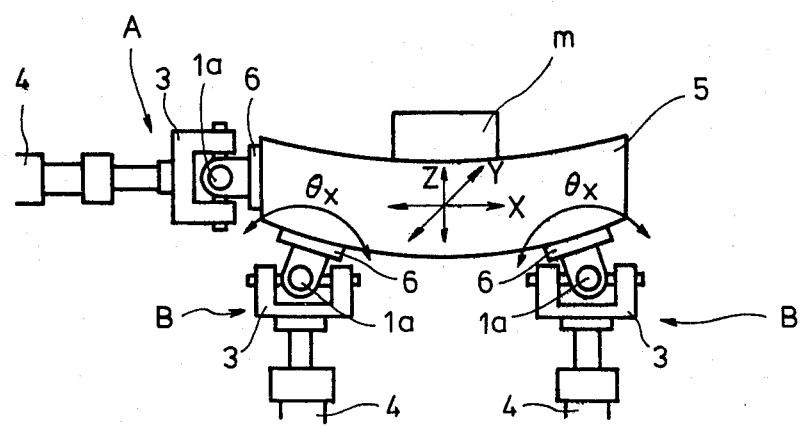
FIG. 10 is a view illustrating the arrangement of coupling devices.

As shown in FIG. 10, the vibration table 5 is operatively connected to a plurality of vibrators 4 through couplings of the type described above. For example, when an axial force is applied from the vibrator 4 of the coupling device A (in the direction X), the axial force is transmitted through the cross-shaft assembly 1a to the vibration table 5 without being affected by the movements in the other axes (Y and Z). The movements of in the other two directions perpendicular to the direction of the axial force (i.e., the directions Y and Z) as well as tilting movements of the vibration table are also exerted toward the coupling device A from vibrators 4 of coupling devices B or the like; however, such movements are absorbed by the axial sliding movement or rotation of the cross-shaft assembly 1a of the coupling device A, so that these movements are not transmitted to the vibrator 4 of the coupling device A. The axial force from the vibrator 4 of the coupling device A causes the coupling devices B to swing in the directions indicated by the double-pointed arrows $\theta_x$. Reference letter m denotes a specimen under test.

The vibrators 4 are so disposed relative to the vibration table 5 that the vibrators 4 vibrate in the X, Y and Z directions with respect to the vibration table 5 as described previously, and the vibrators 4 are connected to the vibration table 5 through the couplings 1a and 1b. As a result, the vibrations generated by a vibrator can be correctly transmitted to the vibration table 5 without being influenced by the vibrations in the other directions generated by the other vibrators 4.

Figure 6:
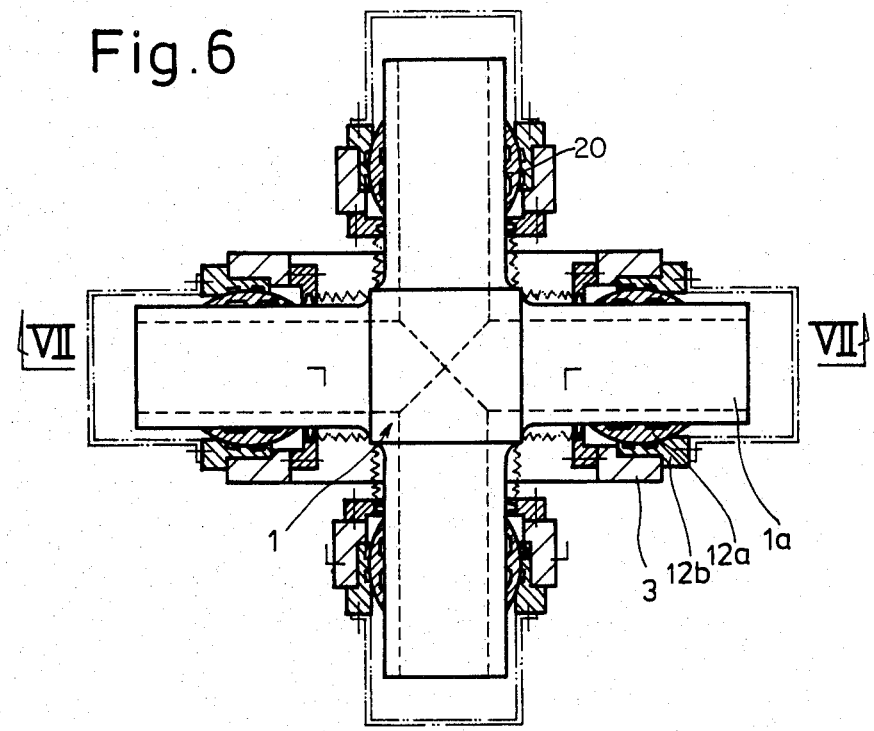
FIG. 6 is a view used for the explanation of a second embodiment of the present invention.
Figure 7:
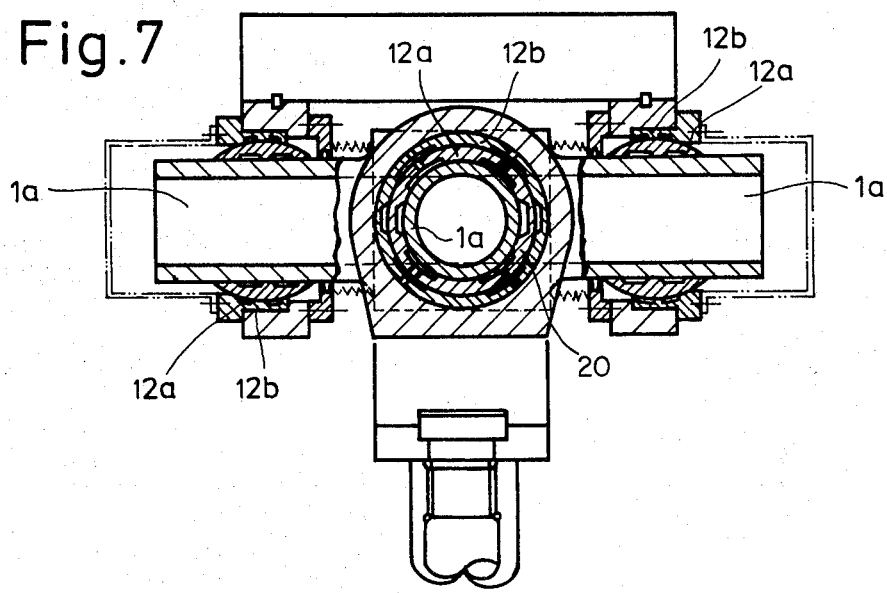
FIG. 7 is a view as viewed in the direction indicated by the arrows VII—VII of FIG. 6.

In FIGS. 6 and 7 is shown a second embodiment of the present invention. In distinction to the first embodiment shown in FIGS. 4 and 5, the hydrostatic bearing consists of an inner spherical part 12a through which the shaft 1a (or 1b) slidably passes, and which is received within an outer spherical part 12b. In addition to the bore through which passes the shaft, localized concave pads 20 are provided at the portion at which the spherical concave and convex surfaces slide each other. Thus, the hydrostatic bearing is provided. As a result, even when the force is exerted on the coupling in the direction of the axis of the vibrator so that the shaft 1a is bowed, the hydrostatic bearings 12a and 12b which incorporate the spherical surfaces slide against each other so that excess or partial contact of the shaft 1a (or 1b) with the bore of the inner bearing 12a can be avoided.

According to the present invention, the following effects and advantages can be attained:
(i) In absorbing movements in the two directions perpendicular to the load direction, according to the prior art, plane surfaces slide against each other so that the hydrostatic bearing is large in size. According to the present invention, however, the movements are absorbed by the axial sliding movement of the cylindrical surfaces of each shaft and its hydrostatic bearing so that the coupling can be compact in size.
(ii) Fabrication, assembly and mounting are simplified.
(iii) The hydrostatic bearing portions are cylindrical surfaces, so that it is easy to form the structure so that the collection of discharged oil from the hydrostatic bearings can be effected within the bearing proper.
(iv) When the couplings of the present invention are used, influences between vibrators can be eliminated so that correct waveforms can be obtained, whereby accurate movement are gained by simple controls.
(v) All vibration assemblies are constructed with the hydrostatic bearings so that frictional resistance is small against every movement and lost motion can be reduced.
(vi) Even when the vibration table 5 is inclined in the direction other than $\theta_x$ shown in FIG. 10, the coupling can absorb such a movement. The coupling of the present invention makes is possible to cause the vibration table to pitch and yaw by controlling every vibrator.

What is claimed is:
1. A device for coupling a vibrating test table to a vibrator, comprising:
   (a) a first pair of spaced axially aligned shafts,
   (b) a second pair of spaced axially aligned shafts which are spaced equally to the spacing of the first pair, and the axis of which intersects the axis of the first pair midway between the shafts of the first pair, whereby the shafts are positioned in co-planar relation at 90° intervals about the point of intersection of their axes,
   (c) a hydrostatic bearing for each shaft which permits rotational and sliding movement of the shaft in the bearing,
   (d) means connecting the hydrostatic bearings for one pair of aligned shafts to a vibrator, and
   (e) means connecting the hydrostatic bearings for the other pair of aligned shafts to a vibration table.
2. A device according to claim 1, in which each of the hydrostatic bearings comprises an inner part having a cylindrical passage therethrough surrounding the shaft and an outer spherical surface, and an outer part having an inner spherical surface surrounding and slidable on the outer surface of the inner part.
3. A device according to claim 1, in which each cross shaft is provided with a sleeve cover which seals the hydrostatic bearing.
4. A device according to claim 3, comprising in addition lubricating pads between the spherical outer surface of the inner part and the spherical inner surface of the outer part.
5. A device according to claim 1, in which each of the hydrostatic bearings comprises a pair of spaced bearing surfaces engaging the shaft and defining between them a space for the reception of a lubricating liquid.

* * * * *